US009842625B1

(12) United States Patent
Huang

(10) Patent No.: US 9,842,625 B1
(45) Date of Patent: Dec. 12, 2017

(54) EXTERNAL HARD DRIVE BOX AND HARD DRIVE DOCKING COMBINATION

(71) Applicant: Cheng Yu Huang, New Taipei (TW)

(72) Inventor: Cheng Yu Huang, New Taipei (TW)

( * ) Notice: Subject to any disclaimer, the term of this patent is extended or adjusted under 35 U.S.C. 154(b) by 0 days.

(21) Appl. No.: 15/414,744

(22) Filed: Jan. 25, 2017

(51) Int. Cl.
| | |
|---|---|
| G11B 33/12 | (2006.01) |
| G11B 33/02 | (2006.01) |
| G11B 33/00 | (2006.01) |
| G06F 1/18 | (2006.01) |

(52) U.S. Cl.
CPC ............ *G11B 33/122* (2013.01); *G06F 1/187* (2013.01); *G11B 33/005* (2013.01); *G11B 33/022* (2013.01); *G11B 33/027* (2013.01); *G11B 33/124* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,389,499 B1* | 5/2002 | Frank, Jr. | ................... | G06F 1/18 361/679.22 |
| 6,411,522 B1* | 6/2002 | Frank, Jr. | ................... | G06F 1/16 174/359 |
| 7,257,827 B2* | 8/2007 | Lee | ...................... | G11B 33/022 312/223.2 |
| 7,336,483 B2* | 2/2008 | Wang | ................... | G11B 33/025 345/169 |
| 7,453,692 B2* | 11/2008 | Chen | ....................... | G06F 1/187 361/679.33 |
| 7,652,878 B2* | 1/2010 | Tsai | ........................ | G06F 1/183 312/223.2 |
| 7,703,291 B2* | 4/2010 | Bushnik | .................... | G01D 3/08 62/259.2 |
| 7,733,659 B2* | 6/2010 | Snider | .................... | H04B 1/082 29/830 |
| 8,174,825 B2* | 5/2012 | Lee | ........................ | G11B 33/025 361/679.31 |
| 2005/0122675 A1* | 6/2005 | Cheng | ....................... | G06F 1/18 361/679.39 |
| 2007/0177346 A1* | 8/2007 | Adachi | ................ | G11B 33/122 361/679.33 |
| 2010/0085700 A1* | 4/2010 | Chang | .................. | G11B 33/123 361/679.33 |
| 2016/0018857 A1* | 1/2016 | Kawabe | ............... | G11B 33/022 361/679.33 |

* cited by examiner

*Primary Examiner* — Lisa Lea Edmonds
(74) *Attorney, Agent, or Firm* — Jackson IPG PLLC; Demian K. Jackson

(57) ABSTRACT

A combination device includes a base, a hinged bottom, a motherboard, and a frame. A first space for accommodating a HDD, a second space for accommodating a cable, and a compartment for accommodating the motherboard are provided in the base and the frame. The compartment includes two grooves at front and rear ends respectively, an opening, and a through hole. A lock member and a first biasing member are disposed in each groove. A pivotal arm is formed with the lock member. The base includes four first bossed holes at four corners respectively, and four second bossed holes. Second biasing members are anchored in the second bossed holes respectively. The frame includes an opening on a central portion of a top for accommodating the connector. The HDD is mounted on the connector. Tops of the second biasing members urge against an inner surface of the top of the frame.

2 Claims, 6 Drawing Sheets

EXTERNAL HARD DRIVE BOX AND HARD DRIVE DOCKING COMBINATION

BACKGROUND OF THE INVENTION

1. Field of the Invention

The invention relates to disk enclosures and more particularly to an external hard drive box and hard drive docking combination.

2. Description of Related Art

Computers have been widely used by people for several decades. It is often that data is required to store. Thus, a number of different data storage devices are developed. One of the most important data storage devices is hard disk drive (HDD). The two most common form factors for modern HDDs are 3.5-inch, for desktop computers, and 2.5-inch, primarily for laptops.

A conventional external hard drive box A for personal computer is shown in FIG. 9 with 3.5-inch HDD (5A) or 2.5-inch HDD (5) mounted therein. Another conventional hard drive docking B for personal computer is shown in FIG. 10 with both 3.5-inch HDD (5A) and 2.5-inch HDD (5) mounted therein.

3.5-inch HDDs are powered by an external power source and 2.5-inch HDDs can draw power from a Universal Serial Bus (USB) port. 2.5-inch HDDs are gaining popularity due to increased storage size and data transfer, and decreased size.

External hard drive box and hard drive docking have respective advantages and disadvantages. In detail, external hard drive boxes have advantages including small size and portability, and disadvantages including fixed HDD which means a replacement with another HDD being impossible, external power being required if the HDD is 3.5-inch, both adapter and power cable being required, and bulky. Regarding hard drive dockings, they have advantages including permitting HDD replacement, and disadvantages including external power being required if the HDD is 3.5-inch, both adapter and power cable being required, and bulky.

In view of above analysis, it is desired to have a combination device having advantages of both an external hard drive box and a hard drive docking.

SUMMARY OF THE INVENTION

It is therefore one object of the invention to provide a combination device comprising a base, a bottom, a motherboard, and a frame mounted on the base, wherein a first space for accommodating a HDD, a second space for accommodating a cable, and a compartment for accommodating the motherboard are provided in both the base and the frame; the compartment includes two grooves at front and rear ends respectively, an opening on one side, and a through hole adjacent to the opening; both a lock member and a first biasing member are provided in each groove; a shaft is provided on a bottom of the groove; an arm includes a bifurcated hole, a lever, and an interconnection formed with the lock member; the shaft has one end inserted into the bifurcated hole to pivotably secure the arm and the shaft together; the base is rectangular and includes four first bossed holes at four corners respectively, and four second bossed holes each adjacent to the first bossed hole; a plurality of second biasing members are anchored in the second bossed holes respectively; the bottom is rectangular and includes a plurality of hinge bars on one side, a plurality of fastening members each disposed between two adjacent hinge bars, a plurality of fasteners each driven through the fastening member into the base to hingedly fasten the bottom and the base together, a bossed hole on the other side, and a latch on the other side of the base and configured to insert into the bossed hole to close the bottom onto the base or disengage from the bossed hole to open the bottom; the motherboard includes a connector for connecting to a HDD, a plurality of USB ports, and an indication light; the motherboard is fastened in the compartment, the USB ports are disposed in the opening, and the indication light is aligned with the through hole; the frame is a hollow parallelepiped and includes an opening on a central portion of a top for accommodating the connector; the HDD is configured to mount on the connector; a cover is releasably disposed on the opening; four pegs are formed on four corners of a bottom of the frame respectively; the pegs are inserted into the first bossed holes respectively; four washers are placed on ends of the pegs respectively; four glides are disposed on bottoms of the washers respectively; tops of the second biasing members urge against an inner surface of the top of the frame; the frame is configured to slide about the base in an upward or downward direction; prior to insertion of the HDD, the frame is pressed on the base with the second biasing members compressed, ends of the lock members urging against two end troughs of the frame respectively in a locked state, and the bottom is closed onto the base respectively; and in response to removing the cover out of the opening, a data connector of the HDD is connected to the connector of the motherboard, the lever is pressed by the HDD to pivot the arm, the interconnection pushes each lock member to unlock each lock member, the second biasing members push the frame upward, the upward pushed frame exposes the USB ports in the opening, and the cable is configured to interconnect the USB ports and a personal computer or a laptop.

The above and other objects, features and advantages of the invention will become apparent from the following detailed description taken with the accompanying drawings.

DETAILED DESCRIPTION OF THE INVENTION

Figure 1:
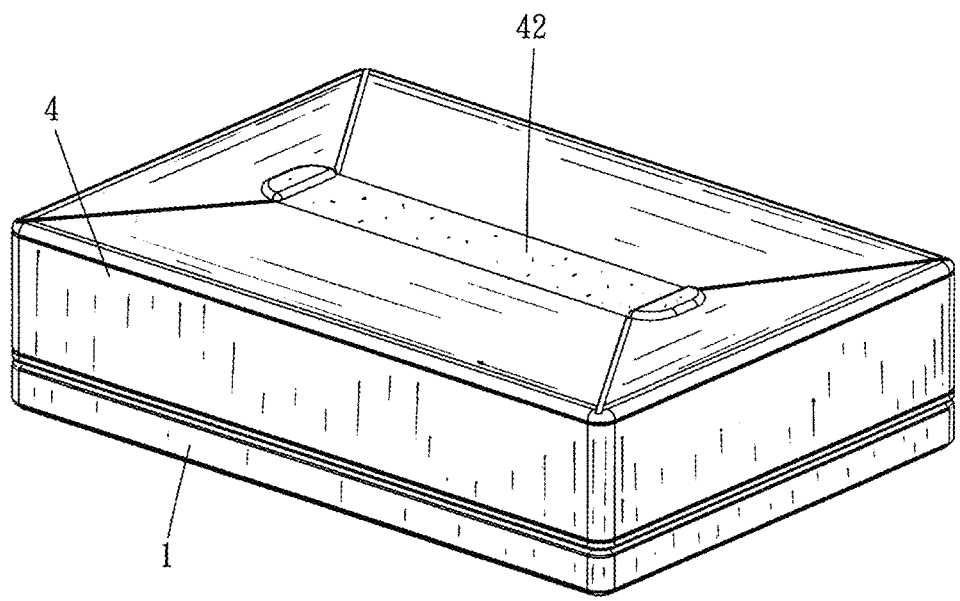
FIG. 1 is a perspective view of an external hard drive box and hard drive docking combination according to the invention.
Figure 2:
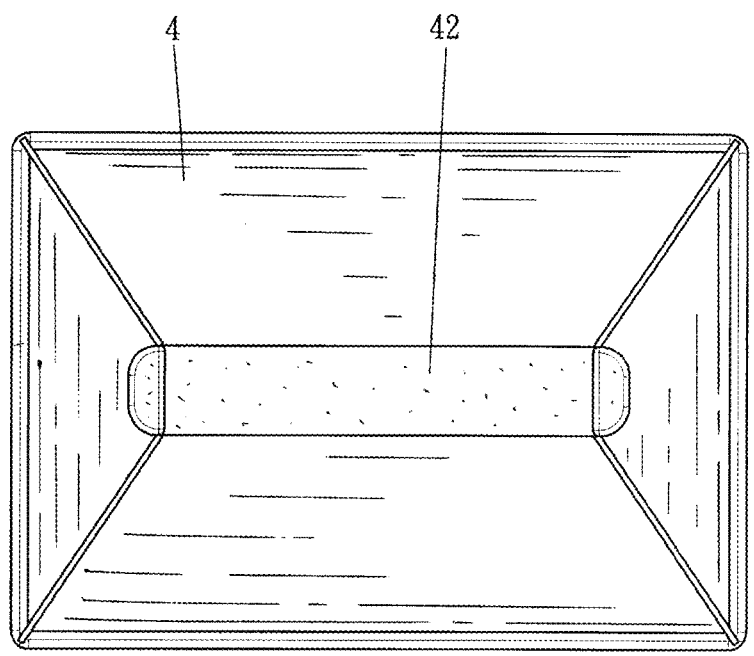
FIG. 2 is a top view of the combination.
Figure 3:
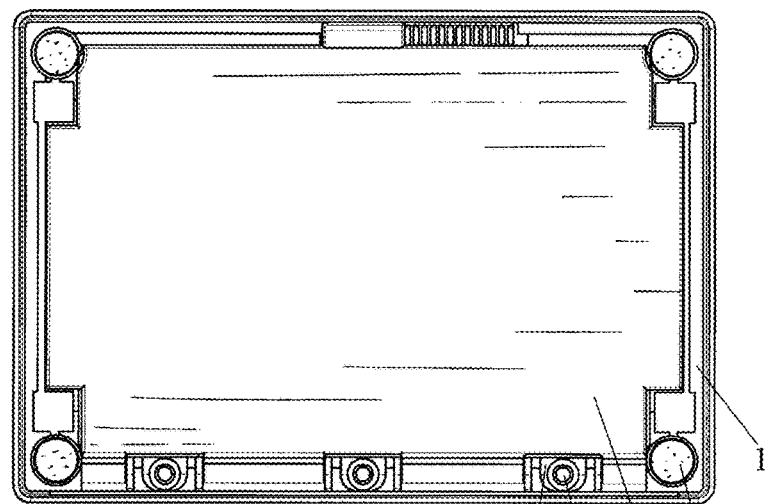
FIG. 3 is a bottom view of the combination.
Figure 4:
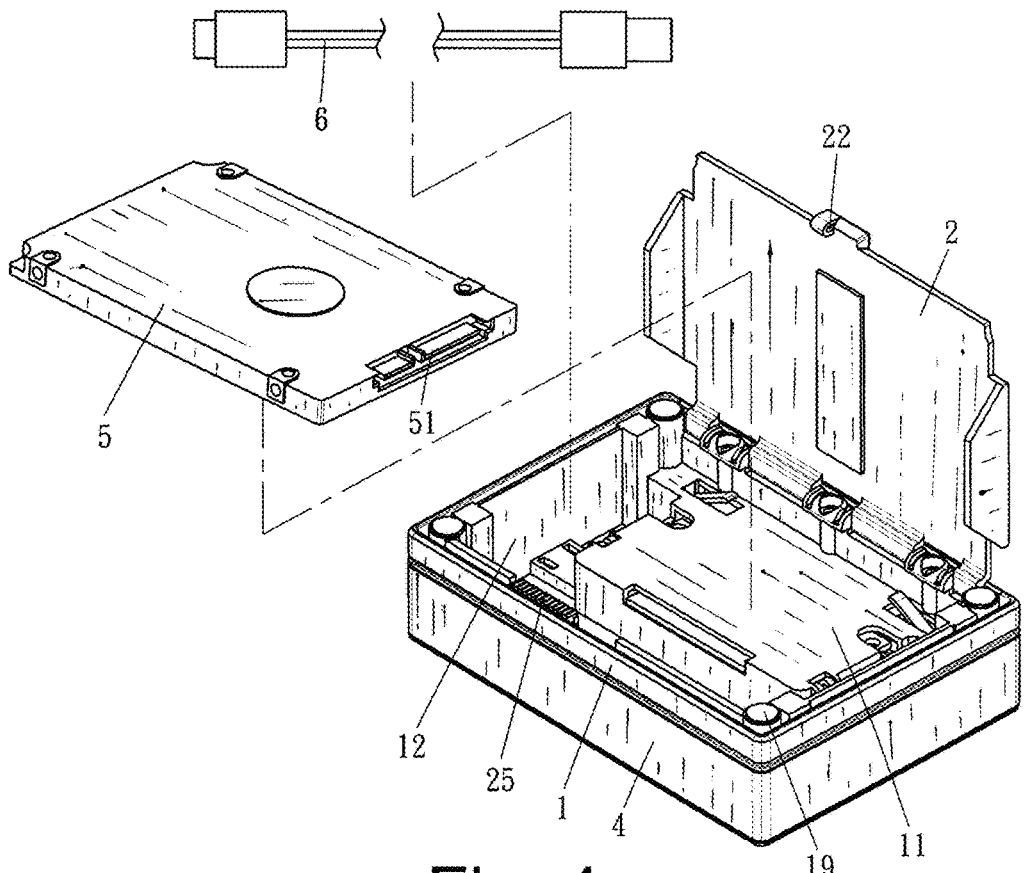
FIG. 4 is an exploded view of the combination by opening the bottom.
Figure 5:
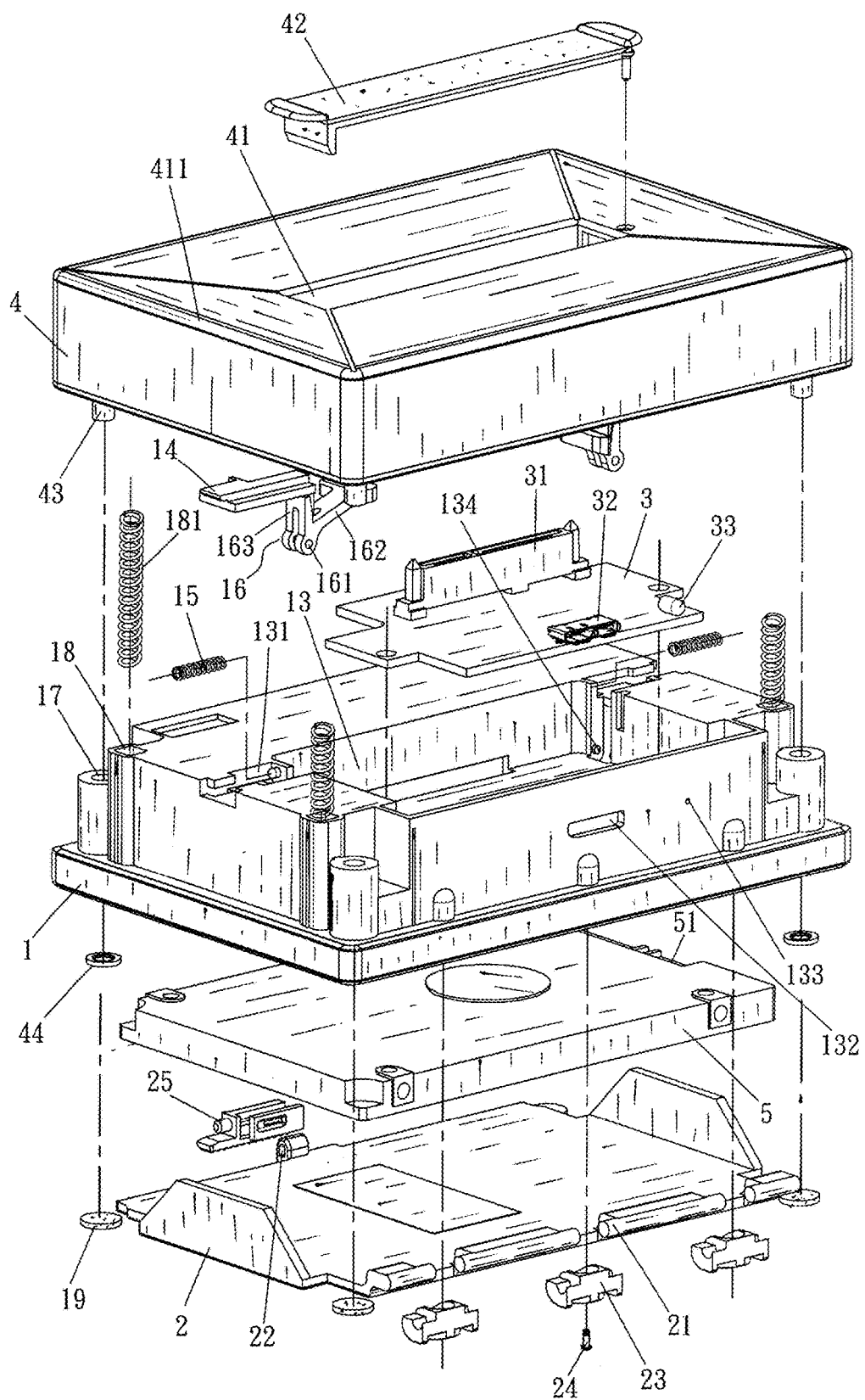
FIG. 5 is a further exploded view of the combination.

Referring to FIGS. 1 to 8, an external hard drive box and hard drive docking combination (called combination hereinafter) in accordance with the invention comprises a base 1, a bottom 2, a motherboard 3, and a frame 4 mounted on the base 1.

A first space 11 for accommodating a 2.5-inch HDD 5, a second space 12 for accommodating a USB cable 6, a compartment 13 for accommodating the motherboard 3 are provided in both the base 1 and the frame 4. The USB cable 6 may connect the combination to a personal computer 7, a laptop 8, a tablet (not shown) or a smartphone (not shown).

The compartment 13 includes two grooves 131 at front and rear ends respectively, an opening 132 on one side, and a through hole 133 adjacent to the opening 132. A lock member 14 and a torsion spring 15 are disposed in each groove 131. A shaft 134 is provided on a bottom of the groove 131. An arm 16 is formed with each lock member 14 and includes a bifurcated hole 161, a lever 162, and an interconnection 163 formed with the lock member 14. The shaft 134 has one holed end inserted into the bifurcated hole 161 to pivotably secure the arm 16 and the shaft 134 together.

The rectangular base 1 includes four first bossed holes 17 at four corners respectively, and four second bossed holes 18 each adjacent to the first bossed hole 17. A plurality of (four) helical springs 181 are anchored in the second bossed holes 18 respectively.

The rectangular bottom 2 includes a plurality of hinge bars 21 on one side, a plurality of fastening members 23 each disposed between two adjacent hinge bars 21, a plurality of fasteners 24 each driven through the fastening member 23 into the base 1 to hingedly fasten the bottom 2 and the base 1 together, a bossed hole 22 on the other side, and a latch 25 on the other side of the base 1 and configured to insert into the bossed hole 22 to close the bottom 2 onto the base 1 or disengage from the bossed hole 22 to open the bottom 2.

The motherboard 3 includes a connector 31 for connecting to a HDD, a plurality of USB ports 32, and an indication light 33. The motherboard 3 is fastened in the compartment 13. The USB ports 32 are disposed in the opening 132 and the indication light 33 is aligned with the through hole 133.

The hollow, parallelepiped frame 4 includes an opening 41 on a central portion of a top for accommodating the connector 31. An 2.5-inch HDD 5 can be mounted on the connector 31. A cover 42 is releasably disposed on the opening 41. Four pegs 43 are formed on four corners of a bottom of the frame 4 respectively. The pegs 43 are inserted into the first bossed holes 17. A washer 44 is placed on an end of each peg 43. Four glides 19 are disposed on bottoms of the washers 44 respectively. Tops of the helical springs 181 urge against an inner surface of the top of the frame 4. Thus, the frame 4 may slide about the base 1 in an upward or downward direction.

Prior to insertion of the 2.5-inch HDD 5, the frame 4 is pressed on the base 1. In this position, the helical springs 181 are compressed, ends of the lock members 14 urge against two end troughs 411 respectively in a locked state, the 2.5-inch HDD 5 is disposed in the first space 11, the USB cable 6 is disposed in the second space 12, and the bottom 2 is closed onto the base 1 respectively.

Figure 6:
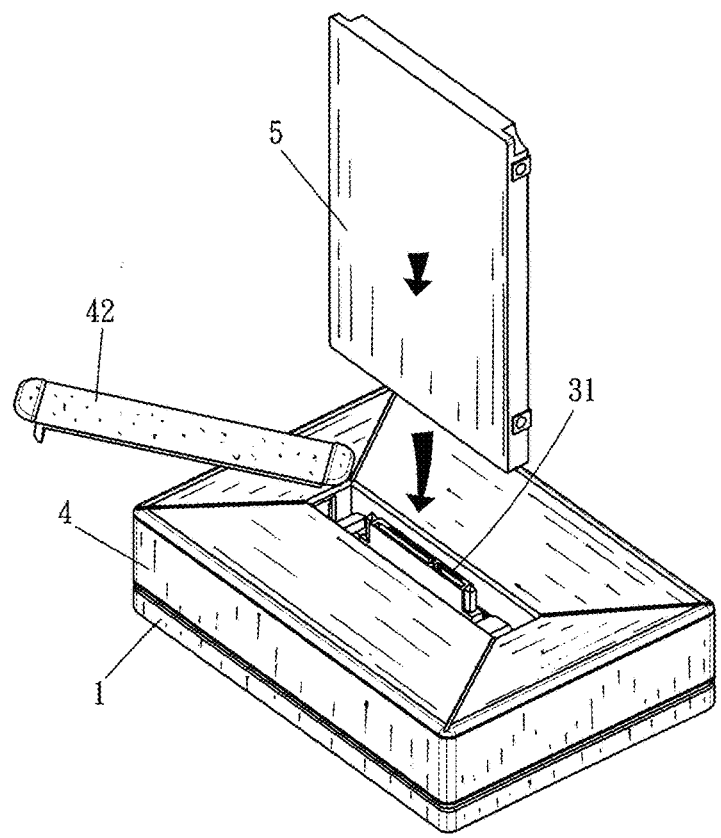
FIG. 6 is a perspective view showing a HDD to be inserted and a USB cable to be connected thereto.
Figure 7:
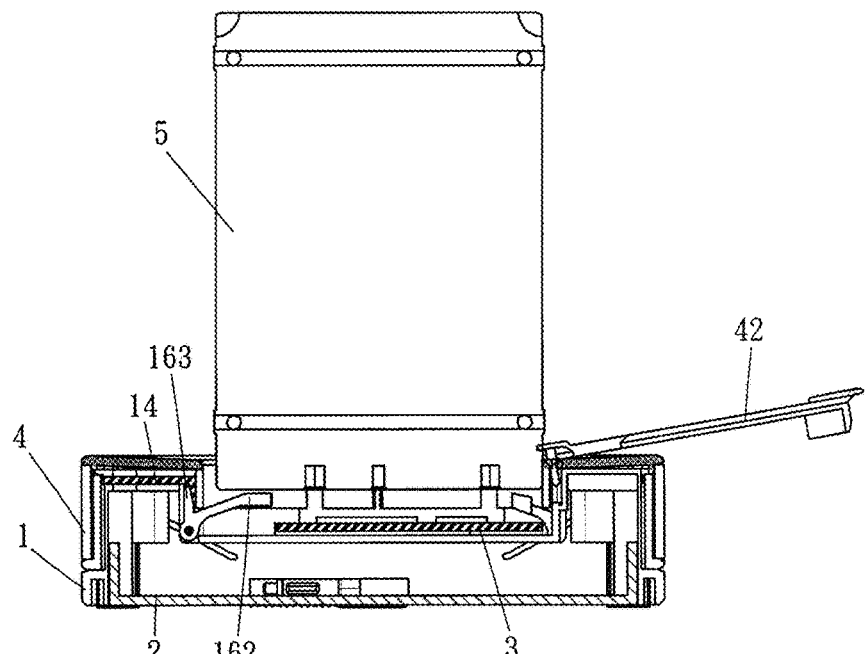
FIG. 7 is a longitudinal sectional view of the combination with the inserted HDD and mounted USB cable.
Figure 8:
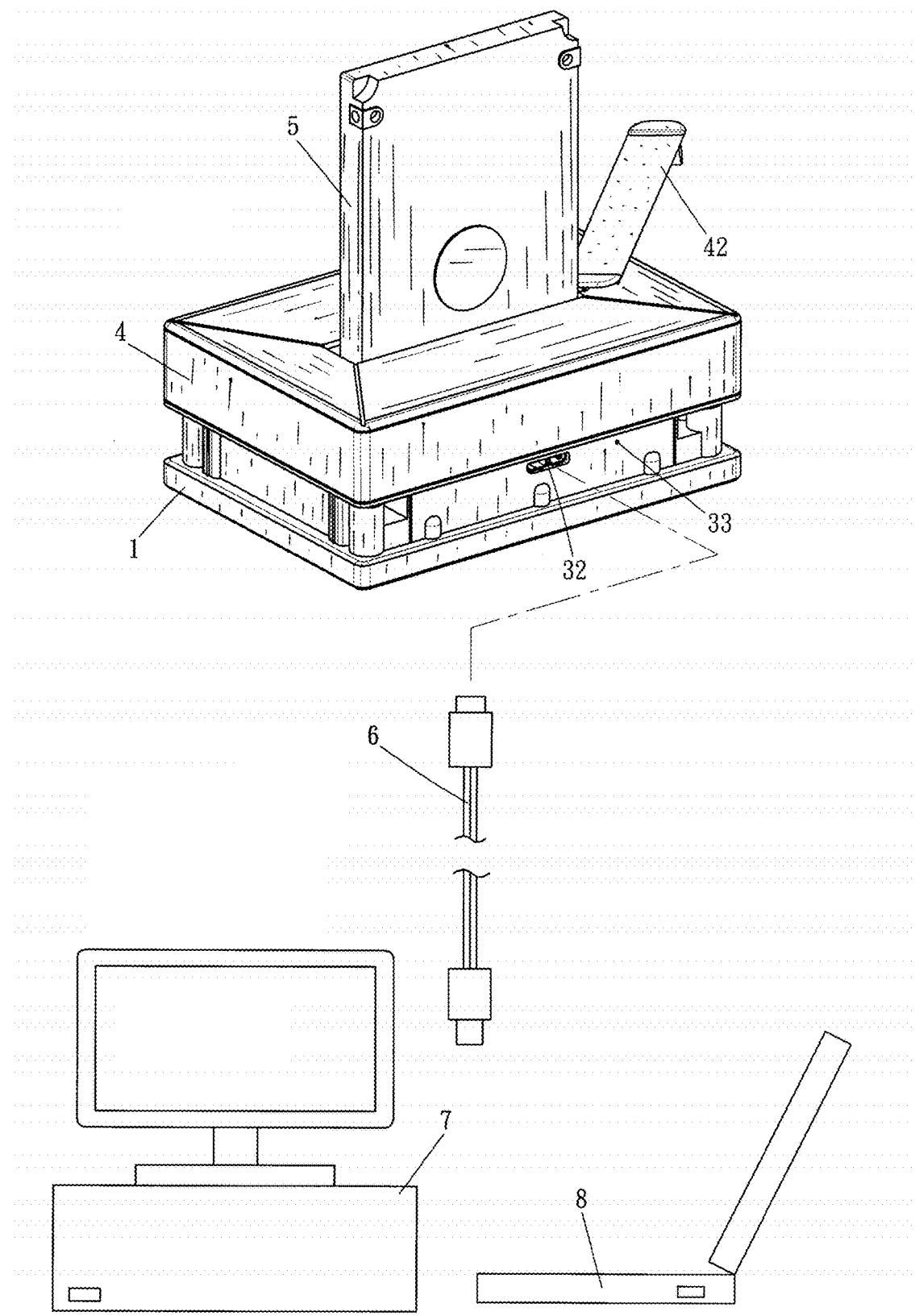
FIG. 8 is a perspective view of FIG. 7 showing the downward pulled base and being ready to connect to a personal computer or a laptop.
Figure 9:
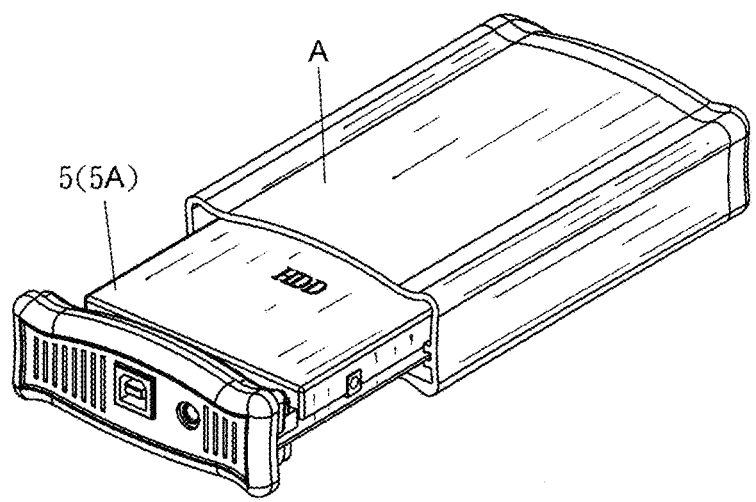
FIG. 9 is a perspective view of a conventional external hard drive box.
Figure 10:
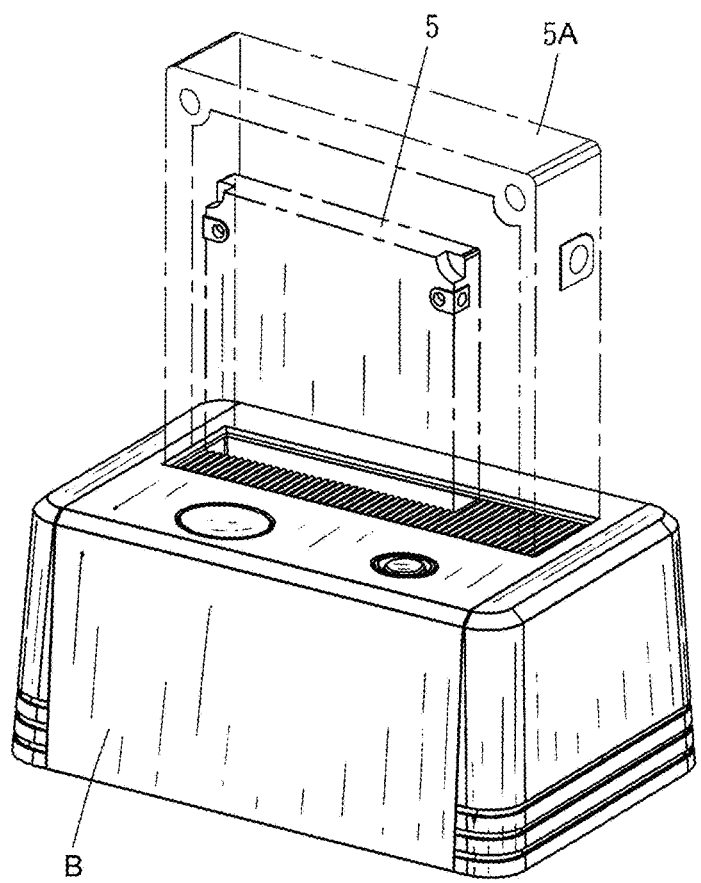
FIG. 10 is a perspective view of a conventional hard drive docking.

As shown in FIGS. 6 to 8 specifically, the cover 42 is removed out of the opening 41 prior to connecting the 2.5-inch HDD 5 to the connector 31 by inserting into the opening 41. Data connector 51 of the 2.5-inch HDD 5 is connected to the connector 31 of the motherboard 3. The lever 162 is pressed by the 2.5-inch HDD 5 to pivot the arm 16. And in turn, the interconnection 163 pushes the lock member 14 to unlock the lock member 14. Thereafter, the helical springs 181 push the frame 4 upward. In FIG. 8, the upward pushed frame 4 exposes the USB ports 32 in the opening 132. The USB cable 6 can be used to interconnect the USB ports 32 and a personal computer 7, a laptop 8, a tablet (not shown) or a smart phone (not shown).

While the invention has been described in terms of preferred embodiments, those skilled in the art will recognize that the invention can be practiced with modifications within the spirit and scope of the appended claims.

What is claimed is:

1. A combination device comprising a base (1), a bottom (2), a motherboard (3), and a frame (4) mounted on the base (1), wherein:

a first space (11) for accommodating a HDD (5), a second space (12) for accommodating a cable (6), and a compartment (13) for accommodating the motherboard (3) are provided in both the base (1) and the frame (4);

the compartment (13) includes two grooves (131) at front and rear ends respectively, an opening (132) on one side, and a through hole (133) adjacent to the opening (132);

both a lock member (14) and a first biasing member (15) are provided in each groove (131);

a shaft (134) is provided on a bottom of the groove (131);

an arm (16) includes a bifurcated hole (161), a lever (162), and an interconnection (163) formed with the lock member (14);

the shaft (134) has one end inserted into the bifurcated hole (161) to pivotably secure the arm (16) and the shaft (134) together;

the base (1) is rectangular and includes four first bossed holes (17) at four corners respectively, and four second bossed holes (18) each adjacent to the first bossed hole (17);

a plurality of second biasing members (181) are anchored in the second bossed holes (18) respectively;

the bottom (2) is rectangular and includes a plurality of hinge bars (21) on one side, a plurality of fastening members (23) each disposed between two adjacent hinge bars (21), a plurality of fasteners (24) each driven through the fastening member (23) into the base (1) to hingedly fasten the bottom (2) and the base (1) together, a bossed hole (22) on the other side, and a latch (25) on the other side of the base (1) and configured to insert into the bossed hole (22) to close the bottom (2) onto the base (1) or disengage from the bossed hole (22) to open the bottom (2);

the motherboard (3) includes a connector (31) for connecting to a HDD, a plurality of USB ports (32), and an indication light (33);

the motherboard (3) is fastened in the compartment (13), the USB ports (32) are disposed in the opening (132), and the indication light (33) is aligned with the through hole (133);

the frame (4) is a hollow parallelepiped and includes an opening (41) on a central portion of a top for accommodating the connector (31);

the HDD (5) is configured to mount on the connector (31);

a cover (42) is releasably disposed on the opening (41);

four pegs (43) are formed on four corners of a bottom of the frame (4) respectively;

the pegs (43) are inserted into the first bossed holes (17) respectively;

four washers (44) are placed on ends of the pegs (43) respectively;

four glides (19) are disposed on bottoms of the washers (44) respectively;

tops of the second biasing members (181) urge against an inner surface of the top of the frame (4);

the frame (4) is configured to slide about the base (1) in an upward or downward direction;

prior to insertion of the HDD (5), the frame (4) is pressed on the base (1) with the second biasing members (181) compressed, ends of the lock members (14) urging against two end troughs (411) of the frame (4) respectively in a locked state, and the bottom (2) is closed onto the base (1) respectively; and in response to removing the cover (42) out of the opening (41), a data connector (51) of the HDD (5) is connected to the connector (31) of the motherboard (3), the lever (162) is pressed by the HDD (5) to pivot the arm (16), the interconnection (163) pushes each lock member (14) to unlock each lock member (14), the second biasing members (181) push the frame (4) upward, the upward pushed frame (4) exposes the USB ports (32) in the opening (132), and the cable (6) is configured to interconnect the USB ports (32) and a personal computer (7) or a laptop (8).

2. The combination device of claim 1, wherein the HDD (5) is a 2.5-inch HDD, and the cable (6) is a USB cable.

\* \* \* \* \*